(12) United States Patent
Radhakrishnan

(10) Patent No.: US 12,395,708 B2
(45) Date of Patent: Aug. 19, 2025

(54) PROVIDING DYNAMIC MEDIA CAPTIONING AND AUGMENTED/VIRTUAL REALITY FEEDBACK IN HOME NETWORK ENVIRONMENTS

(71) Applicant: ARRIS Enterprises LLC, Suwanee, GA (US)

(72) Inventor: Rajesh Radhakrishnan, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 225 days.

(21) Appl. No.: 17/647,251

(22) Filed: Jan. 6, 2022

(65) Prior Publication Data

US 2022/0303636 A1    Sep. 22, 2022

Related U.S. Application Data

(60) Provisional application No. 63/164,186, filed on Mar. 22, 2021.

(51) Int. Cl.
| | | |
|---|---|---|
| *H04N 21/488* | (2011.01) | |
| *G06N 20/00* | (2019.01) | |
| *G10L 15/26* | (2006.01) | |
| *H04N 21/422* | (2011.01) | |

(52) U.S. Cl.
CPC ......... *H04N 21/4884* (2013.01); *G06N 20/00* (2019.01); *G10L 15/26* (2013.01); *H04N 21/42203* (2013.01)

(58) Field of Classification Search
None
See application file for complete search history.

(56) References Cited

U.S. PATENT DOCUMENTS

| | | | |
|---|---|---|---|
| 2005/0038661 A1* | 2/2005 | Momosaki | H04N 5/775 348/E5.122 |
| 2014/0201631 A1* | 7/2014 | Pornprasitsakul | G06F 40/58 715/716 |
| 2019/0251952 A1 | 8/2019 | Arik et al. | |
| 2020/0336796 A1* | 10/2020 | Hu | H04N 21/4307 |

OTHER PUBLICATIONS

Arik et al., "Neural Voice Cloning with a Few Samples", 32nd Conference on Neural Information Processing Systems (NeurIPS 2018), Montréal, Canada, 11 pages.

* cited by examiner

*Primary Examiner* — Samira Monshi
(74) *Attorney, Agent, or Firm* — Panitch Schwarze Belisario & Nadel LLP

(57) ABSTRACT

Technologies are disclosed for providing captioning for media content that may be performed by a media control device. An input may be received indicating at least one request for caption content for at least a part of the media content. One or more frames of the media content that may correspond to the request for caption content may be ascertained. Specific content from the one or more frames of the media content that may correspond to the request for caption content may be ascertained. At least one source of the caption content may be identified. The caption content may be provided in a format such that the caption content may be displayable with the one or more frames of the media content, for example in modified presentation of the media content.

23 Claims, 5 Drawing Sheets

PROVIDING DYNAMIC MEDIA CAPTIONING AND AUGMENTED/VIRTUAL REALITY FEEDBACK IN HOME NETWORK ENVIRONMENTS

BACKGROUND

Media content (e.g., a form of more general electronic content) may be provided by a plurality of media content network operators to home and/or business subscribers/viewers. Media content network operators (e.g., cable network operators, or satellite operators, etc.) may provide subscribers/viewers with various forms of media content, such as movies, concerts, premium media content, broadcast media content, and/or pay-per-view (PPV) media content, and/or the like.

Media content network operators deploy consumer premises equipment (CPE) in residential and/or commercial environments, among other consumer environments, as part of the media content delivery network. The various CPE devices are activated and/or configured based on a variety of factors, such as consumer identities, subscriptions, and/or preferences, etc.

Consumers, for various reasons, may use captioning while monitoring media content. Captioning (e.g., closed captioning, or the like) may provide the consumer/viewer with assistance in understanding spoken dialogue in the portrayed media content. Captioning may provide assistance for viewers with hearing disabilities. Captioning may provide assistance with viewers with media content that may include one or more scenes that may include high volume dialogue, complicated dialogue, relatively loud background music, and/or relatively loud background noise, for example.

Consumer consumption of media content (e.g., video) may have significantly changed in recent time. For example, more video may be consumed via streaming devices more each day. For example, a camera and/or a set of cameras (e.g., in a home or business network) could be used in various ways, such as videoconferencing, among other uses.

SUMMARY

Technologies are disclosed for providing captioning for media content that may be performed by a media control device. The media control device may be in communication with a microphone device; perhaps for example, via a user network such as subscriber network 130, and/or the Internet. The media control device may be a set-top box, a home gateway, a mobile device, a media gateway, a television, and/or a personal computing device, among other devices, for example.

The media control device may be configured to receive an input that may indicate at least one request for caption content for at least a part of the media content. The media control device may be configured to ascertain one or more frames of the media content that may correspond to the request for caption content. The media control device may be configured to ascertain specific content from the one or more frames of the media content that may correspond to the request for caption content. The media control device may be configured to identify at least one source of the caption content. The media control device may be configured to provide the caption content in a format such that the caption content is displayable with the one or more frames of the media content.

In one or more scenarios, the media control device may be configured to provide a visual preview of the one or more frames of the media content that may correspond to a potential request for caption content. The media control device may be configured to receive an input that may indicate a confirmation of the visual preview of the one or more frames of the media content that may correspond to the potential request for caption content. The media control device may be configured to store the visual preview in a memory of the media control device, perhaps for example in a format that may be accessible by at least one monitor device. The stored visual preview may be referable by the input indicating at least one request for caption content for at least a part of the media content.

In one or more scenarios, the media control device may be configured to receive an input, perhaps for example via the microphone device, that may correspond to a user-provided caption content for the one or more frames of the media content. The media control device may be configured to store the user-provided caption content in at least a memory of the media control device, among other locations. The stored user-provided caption content may serve as the at least one source of the caption content.

In one or more scenarios, the media control device may be configured such that the input indicating the at least one request for caption content for the at least a part of the media content may comprise one or more requests. The one or more requests may comprise a request for caption content that may correspond to at least one scene in which a user-designated character's voice may be audible, a request for caption content corresponding to at least one scene of the media content that may have an audio level exceeding a user-designated threshold, a request for caption content that may correspond to at least one scene in the media content in which a user-designated sound may be audible, a request for caption content that may correspond to at least one scene in the media content in which a user-designated activity may be portrayed, a request for caption content that may correspond to at least one scene in the media content in which one or more sounds consistent with a user-designated activity may be audible, a request for caption content that may correspond to at least one scene in the media content in which any spoken words may be audible, and/or a request for caption content that may correspond to at least one scene in the media content in which one or more user-designated words may be audible.

In one or more scenarios, the media control device may be configured to ascertain at least one frame of the one or more frames of the media content that may correspond to the request for caption content, perhaps for example by using one or more audio analytics algorithms. The media control device may be configured to identify one or more frames that may be substantially similar to the at least one frame of the one or more frames of the media content that may correspond to the request for caption content using a machine-learning audio algorithm, and/or a machine-learning video algorithm, for example, among other techniques.

In one or more scenarios, the media control device may be configured to store the caption content in the displayable format in at least a memory of the media control device, and/or to provide the displayable caption content with at least the one or more frames, perhaps for example in a modified presentation of the media content.

In one or more scenarios, the media control device may be configured such that to identify the at least one source of the caption content may include identifying at least one Internet-based database that may include at least some of the requested caption content, identifying at least one speech-to-text algorithm that may provide at least some of the requested caption content, identifying a user-provided caption content that may be designated by the user to provide at least some of the requested caption content; and/or identifying a user-created caption content database that may include at least some of the requested caption content.

In one or more scenarios, the media control device may be configured to receive an input that may correspond to a request for a text summarization of the one or more frames of the media content that may correspond to the request for caption content. The media control device may generate the text summarization of the one or more frames of the media content that may correspond to the request for caption content. The media control device may be configured to store the text summarization in at least a memory of the media control device, and/or to provide the text summarization in a displayable form.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

Figure 1:
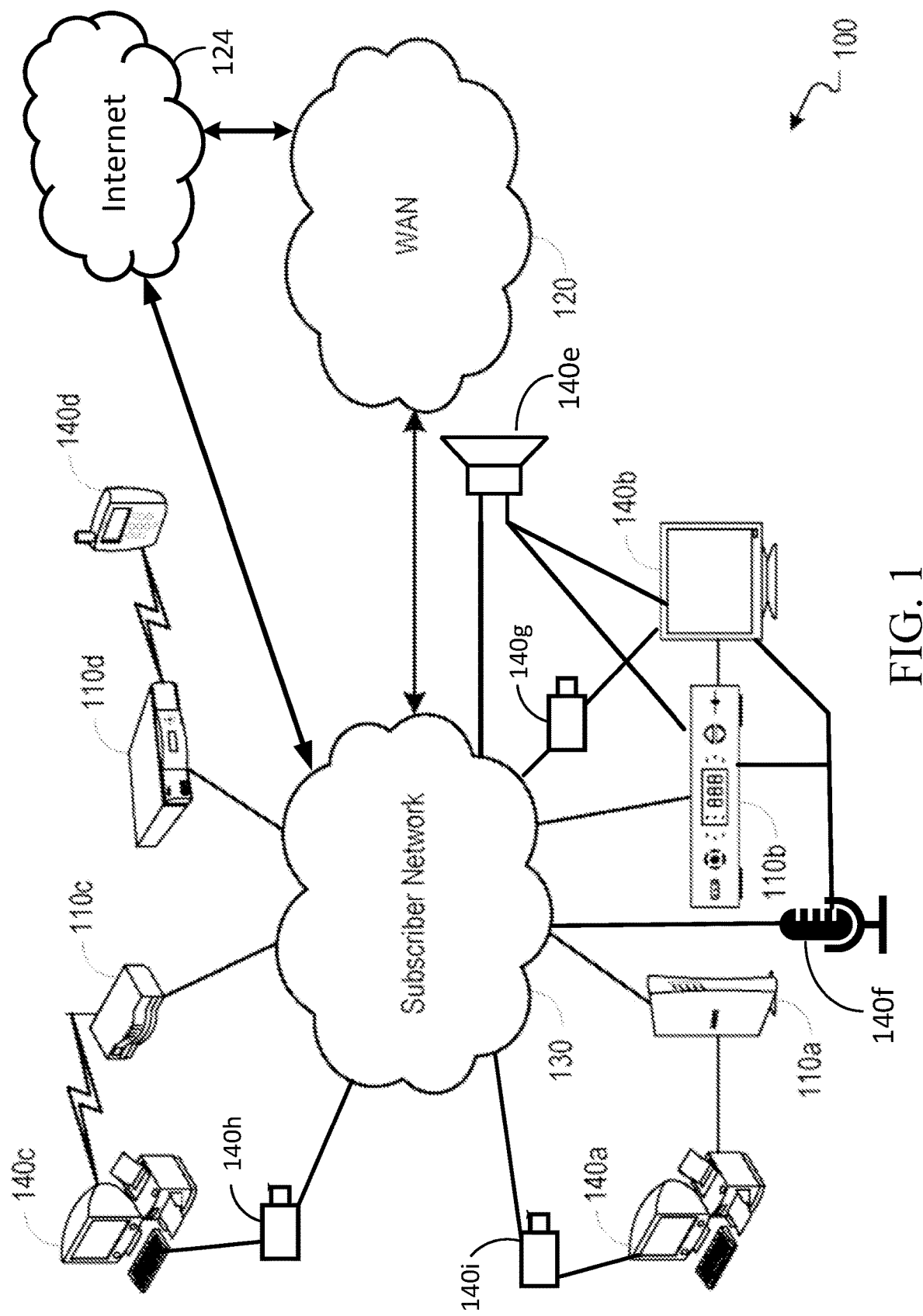
FIG. 1 is a block diagram illustrating an example network environment operable to deliver electronic content throughout the network via one or more network devices, such as a consumer premises device (CPE) device, among other devices.

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

FIG. 1 is a block diagram illustrating an example network environment 100 operable for electronic content delivery. Electronic content may include media content, electronic documents, device-to-device communications, streaming media content, Internet/cloud-based electronic applications/services/databases, electronic communications/services (e.g., video/audio conferencing), Internet-based electronic services, virtual reality content and/or services, augmented reality content and/or services, media captioning content and/or services, electronic commerce, video components/elements of electronic content, and/or audio components/elements of electronic content, among other types of electronic content.

A media content delivery network operator, or MSO, may deliver media content to subscribers/viewers. Media content may be provided via a consumer premise equipment (CPE) and/or network gateway device supported by the MSO, for example. In one or more scenarios, CPE devices 110a-d receive video service(s) and/or data service(s) from a wide area network (WAN) 120 via a connection to a subscriber network 130. The one or more nodes of subscriber network 130 and/or the WAN 120 may communicate with one or more cloud-based nodes (not shown) via the Internet 124. The subscriber network 130 and/or WAN 120 may include a home gateway (not shown), that may be used to implement set-top box functionality, among other functions.

The CPE devices can include, for example, a modem 110a, a set-top box 110b, a wireless router including an embedded modem 110c, or a media gateway 110d, among many others (e.g., digital subscriber line (DSL) modem, voice over internet protocol (VOIP) terminal adapter, video game console, digital versatile disc (DVD) player, communications device, hotspot device, etc.). The subscriber network 130, for example, can be a network of an MSO subscriber or user, or associated with premises of the MSO subscriber or user; for example, a local area network (LAN), a wireless local area network (WLAN), a personal area network (PAN), as well as others.

The CPE devices can facilitate communications between the WAN 120 and client devices 140a-140i. A cable modem or embedded MTA (eMTA) 110a can facilitate communications between the WAN 120 and a computer 140a. A set-top box 110b can facilitate communications between the WAN 120 and a television/monitor 140b (e.g., a media presentation device) and/or a digital video recorder (DVR). A wireless router 110c can facilitate communications between a computer 140c and the WAN 120. The media gateway 110d can facilitate communications between a mobile device 140d (e.g., a tablet computing device, a smartphone, a personal digital assistant (PDA) device, a laptop computing device, etc.; one or more devices being PC-based, iOS-based, Linux-based, and/or Android-based, etc.) and the WAN 120. One or more speaker devices (e.g., sound radiation devices/systems) 140e may be in communication with the Subscriber Network 130, set-top box 110b, and/or television 140b, etc. Camera devices 140g, 140h, and/or 140i may be in communication with the computer 140a, the television 140b, the computer 140c, and/or the Subscriber Network 130, for example, among other devices and networks.

The one or more speaker devices 140e (e.g., surround sound speakers, home theater speakers, other external wired/wireless speakers, loudspeakers, full-range drivers, subwoofers, woofers, mid-range drivers, tweeters, coaxial drivers, etc.) may broadcast at least an audio component of electronic content/media content, among other audio signals/processes/applications. The one or more speaker devices 140e may possess the capability to radiate sound in pre-configured acoustical/physical patterns (e.g., a cone pattern, a directional pattern, etc.)

One or more microphone devices 140f may be external/standalone microphone devices. The one or more microphone devices 140f may be in communication with the Subscriber Network 130, set-top box 110b, television 140b, computer 140a, computer 140c, mobile device 140a, etc. Any of the client devices 140a-140i may include internal microphone devices. The one or more speaker devices 140e (e.g., "speakers") and/or the one or more microphone devices 140f (e.g., "microphones", that may be "high quality" devices such as far field microphones, noise-cancelling microphones, shotgun microphones, dynamic microphones, ribbon microphones, and/or various size diaphragm microphones, Bluetooth™-based remote/control devices, RF4CE-based remote/control devices, etc.) may have wired and/or wireless connections (e.g., Bluetooth, Wi-Fi, private protocol communication network, etc.) to any of the other devices 140a-140i, the Subscriber Network 130, the WAN 120, and/or the Internet 124.

The camera devices 140g-140i may provide digital video input/output capability for one or more of the devices 110a-110d and/or devices 140a-140d. The camera devices 140g-140i may communicate with any of the devices 110a-110d and/or devices 140a-140f, perhaps for example via a wired and/or wireless connection. One or more of the camera devices 140g-140i may capture digital images and/or may scan images of various kinds, such as Universal Product Code (UPC) codes and/or Quick Response (QR) codes, for example, among other images. One or more of the camera devices 140g-140i may provide for video input/output for video conferencing (e.g., may serve as webcams or the like), for example, among other video functions.

Any of the camera devices 140g-140i may include microphone devices and/or speaker devices. The input/output of any of the camera devices 140g-140i may include audio signals/packets/components, perhaps for example separate/separable from, or in some (e.g., separable) combination with, the video signals/packets/components of any of the camera devices 140g-140i.

One or more of the camera devices 140g-140i may detect the presence of one or more people that may be proximate to the camera devices 140g-140i and/or that may be in the same general space (e.g., the same room) as the camera devices 140g-140i. One or more of the camera devices 140g-140i may gauge a general activity level (e.g., high activity, medium activity, and/or low activity) of one or more people that may be detected by the camera devices 140g-140i. One or more of the camera devices 140g-140i may detect one or more general characteristics (e.g. height, body shape, skin color, pulse, heart rate, breathing count, etc.) of the one or more people detected by the camera devices 140g-140i. One or more of the camera devices 140g-140i may be configured to recognize one or more specific people, for example.

One or more of the camera devices 140g-140i may be use wireless communication with any of the devices 110a-110d and/or 140a-140d, such as for example Bluetooth™ and/or Wi-Fi™, among other wireless communication protocols. One or more of the camera devices 140g-140i may be external to any of the devices 110a-110d and/or devices 140a-140d. One or more of the camera devices 140g-140i may be internal to any of the devices 110a-110d and/or devices 140a-140d.

A user (not shown) may monitor (e.g., watch and/or listen to) and/or create media content and/or more generally interact with various kinds of electronic content on/from/via one or more of the devices 110a-110d and/or 140a-140i, among other devices (not shown), for example. The electronic content may be encrypted via one or more encryption techniques, such as symmetrical and/or asymmetrical encryption. Any of the devices 110a-110d and/or 140a-140i may utilize one or more digital certificates to initiate, and/or engage in, encrypted communication to obtain, interact, and/or monitor electronic content that may be conveyed via the Internet 124, the WAN 120, and/or the Subscriber Network 130, etc., for example.

For example, a CPE device, such as a set-top box 110b and/or any of the devices 110a-110d and/or 140a-140i, may be used to receive service from a network services provider. For various reasons, perhaps for example when a consumer engages a network services provider for a new/fresh service and/or a change in an existing service, and/or perhaps when a CPE device may be replaced (e.g., for maintenance, upgrade, etc.), one or more consumer profiles may be implemented on the CPE device (e.g., may need to be implemented).

Captioning systems may be a legally required in one or more scenarios. More generally, captioning may enhance the user engagement/enjoyment of the media content and/or may create a wider user/viewer/consumer/audience reach for the media content. Captioning may be created on the generation side, by the creator, and/or outsourced to a caption company. Captioning that may be generated by the media content itself and/or by the user may provide for an even wider user/viewer/consumer/audience reach, for example.

Such content-generating caption content and/or user-generated caption content could benefit from advances in machine learning, algorithms, optimizations, processing power of computing machines, availability of better data bandwidth, deployment of the so-called 5G cellular communication systems and devices, cloud/Internet connectivity, and/or cloud/Internet computing. For example, the role of software may be useful in media content (e.g., video) consumption. In a home video ecosystem, analytics may be used to enhance the user experience, perhaps for example by data mining of user preferences, and/or location of the user, among other analytics. For example, the user's home video/television screen guide can contain one or more recommendations of media content based on the user's previous viewing choices/behaviors, among other benefits of analytics.

For various reasons, consumers/viewers/users may wish to include caption content for the media content that they may wish to monitor (e.g., at some time, etc.). The user may wish to tailor a request for caption content for a media content to satisfy the user's specific interest in caption content, for example perhaps as compared to receiving caption content for the entirety of the media content. The user may wish to include caption content for a media content that the user themselves may provide to be used as the caption content for the media content, for example.

Using current methods and/or devices, consumers/viewers/users might not have the service and/or capability to obtain caption content for media content that may be tailored to the user's specific caption content request and/or to create user-provided caption content for media content, for example.

Technologies that may provide consumers/media content viewers/users with an ability to obtain/create specific caption content and/or user-provided caption content may be useful. Capabilities, techniques, methods, and/or devices described herein may at least facilitate a user in obtaining caption content for media content that may be tailored to the user's specific caption content request and/or creating user-provided caption content for media content. For example, the user may selectively view and/or not view the caption content during a (e.g., modified) presentation of the media content, among other scenarios.

In one or more scenarios, any of the devices 110a-110d, 140a-140i, among other devices, may be used by one or more media content (e.g., video) viewers/users to implement any of the capabilities, techniques, methods, and/or devices described herein.

The WAN network 120 and/or the Subscriber Network 130 may be implemented as any type of wired and/or wireless network, including a local area network (LAN), a wide area network (WAN), a global network (the Internet), etc. Accordingly, the WAN network 120 and/or the Subscriber Network 130 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, computing devices, and/or storage devices, etc.

Figure 2:
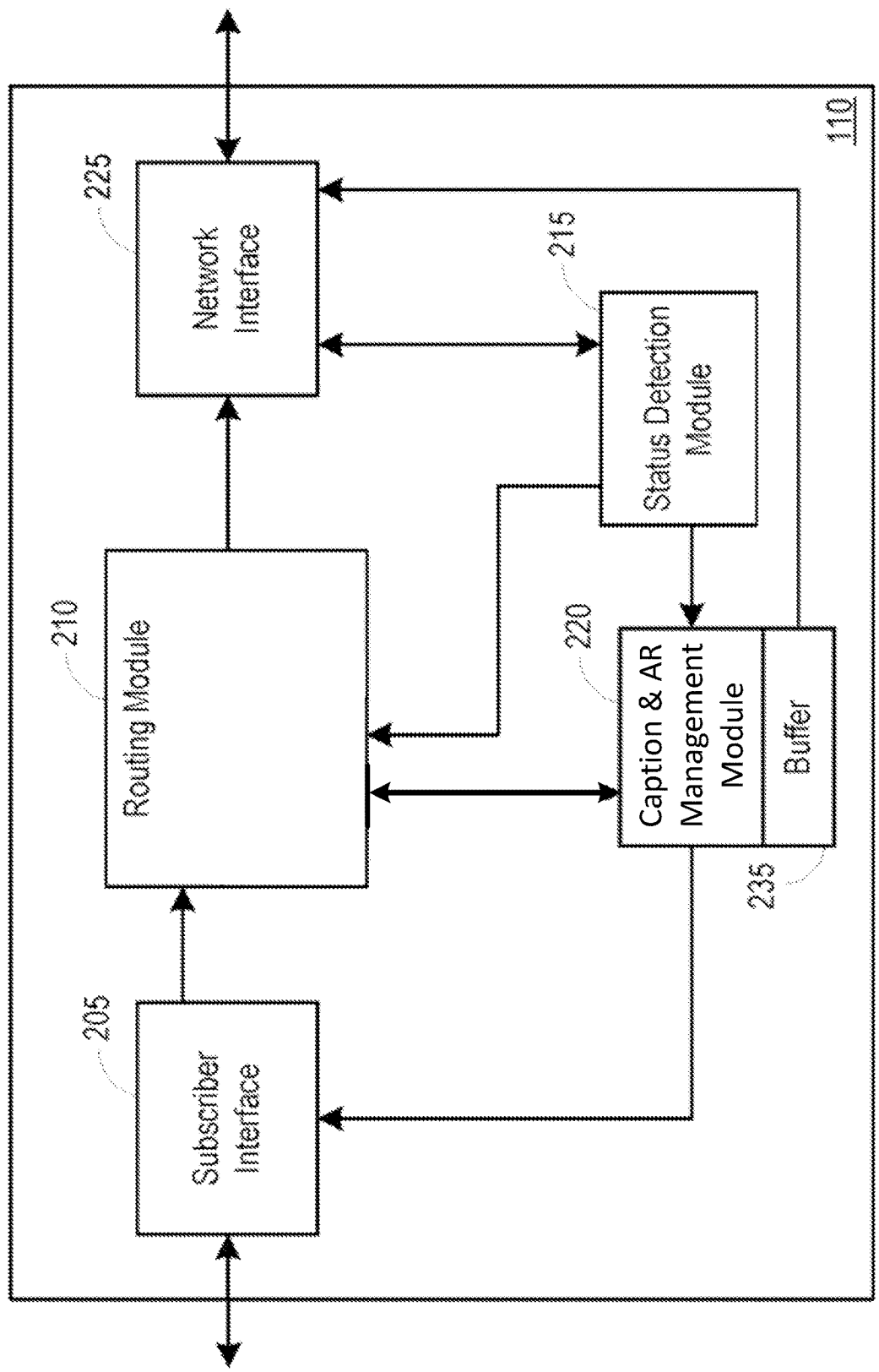
FIG. 2 is a block diagram illustrating an example CPE device of FIG. 1 that may be configured to deliver electronic content to a subscriber.

FIG. 2 is a block diagram illustrating an example CPE device 110 (e.g., any of the devices 110a-110d) operable to output audio/visual electronic content/media content, and/or receive same, to/from one or more devices, such as for example, the television/monitor 140b, mobile device 140d, computer 140c, computer 140a, one or more speaker devices 140e, one or more microphone devices 140f, and/or camera devices 140h-140i, etc. The CPE device 110 can include a subscriber interface 205, a routing module 210, a status detection module 215, a caption & augmented reality (AR) module 220, and/or a network interface 225.

In one or more scenarios, the CPE device 110 may receive a communication from a subscriber or subscriber device (e.g., subscriber device 140a-140i of FIG. 1). For example, the communication can be a request for data and/or a service from a network (e.g., WAN 120 of FIG. 1). A communication received from a subscriber or subscriber device can be received as a resource identifier (e.g., URL, and/or an IP address, and/or other formats).

In one or more scenarios, a routing module 210 may route a received communication to a network interface 225. The routing module 210 may route the communication to the network interface 225. The routing module may translate the received communication from a URL to an IP address.

In one or more scenarios, a media control device (e.g., set-top box 110b and/or any of the devices 110a-110d and/or 140a-140i, among other devices) and/or its caption & AR management module 220 may be configured to service caption content user requests. In one or more scenarios, analytics and/or software-as-a-service (SaaS) models, among other techniques, at least in part, may be used to provide closed-captioning-as-a-service (CCaaS), perhaps for example in a home-based media control device, among other scenarios.

In one or more scenarios, media content (e.g., third-party media content, commercial media content, user-generated media content, etc.) can be provided/uploaded by a user (e.g., through a home network connected device, among other scenarios). CCaaS may be applied to the media content to generate (e.g., auto generate) caption content, perhaps for example by using deep learning algorithms (e.g. deep neural nets), among other techniques. In one or more scenarios, caption content may be generated offline and/or online, perhaps for example using (e.g., near) real-time algorithms. For example, user-requested specific caption content and/or user-generated caption content may (e.g., seamlessly) enhance the user experience in near real time.

Without the capabilities, techniques, methods, and/or devices described herein, the skilled artisan would not appreciate how to provide a service and/or capability for a user to obtain caption content for media content that may be tailored to the user's specific caption content request and/or to create user-provided caption content for media content. For example, the user may selectively view/not view the caption content in a (e.g., modified) presentation of the media content.

In one or more scenarios, a media control device and/or the caption & AR management module 220 of a media control device may be configured to provide captioning for media content. The media control device may be in communication with a microphone device; perhaps for example, via a user network such as subscriber network 130, and/or the Internet/Cloud. The media control device may be a set-top box such as device 110b, among other devices 110a-110d and/or 140a-140i, and/or a cloud-based computing device, among other devices, for example.

The caption & AR management module 220 may be configured to receive an input that may indicate/correspond to at least one request for caption content for at least a part of the media content. For example, a user can choose to select/designate one or more scenes of interest in the media content for captioning (e.g., perhaps only for the selected/designated one or more scenes).

For example, the user can choose to caption one or more, or all, scenes in one or more depicted noisy environments in the media content, among other types of media content scenes. For example, a user may designate/select one or more scenes from the media content that depict/portray two or more characters/people involved in a conversation. For example, a user may designate/select one or more scenes from the media content that depict/portray two or more characters/people involved in a conversation. For example, a user may designate/select one or more scenes from the media content that depict/portray at least one character/person walking a dog. For example, a user may designate/select one or more scenes from the media content that depict/portray one or more characters/people on a dance floor, etc.

In one or more scenarios, an application programming interface (API), or the like, may provide for the user to select/designate the one or more scenes of interest, for example using Text-to-Speech converted Natural Language Processing (NLP) text. For example, NLP can be used to annotate the user selection/designation of the one or more scenes of interest. For example, a user and/or a nuance application may generate a text that may include a user choice like "all scenes from the dance floor" of the media content, among other scenarios. For example, by using NLP, one or more machine learning algorithms can (e.g., automatically) build one or more contextual keywords, like "dance" etc. In one or more scenarios, such data can be used to analyze/train, and/or to learn, the user's choices/preferences, which can be a source for targeted advertisement information, for example.

In one or more scenarios, the API may be configured to provide the user prompts to identify one or more scenes, specific content, and/or activities of interest in the media content and/or to accept the user's manual data entry identifying the one or more scenes, specific content, and/or activities of interest in the media content, for example in reply to the prompts or otherwise.

The caption & AR management module 220 may be configured such that the input indicating the at least one request for caption content for the at least a part of the media content may comprise one or more requests. In one or more scenarios, among others, the one or more requests may include one or more of a request for caption content that may correspond to at least one scene in which a user-designated character's voice is audible, a request for caption content that may correspond to at least one scene of the media content having an audio level exceeding a user-designated threshold (e.g., some prompted and/or user-provided sound decibel threshold, a qualitative description such as "soft", "moderate", "loud", and/or "very loud", etc., and/or the like), a request for caption content that may correspond to at least one scene in the media content in which a user-designated sound is audible/depicted/portrayed. The user request and/or the identified one or more frames of the media content of interest may take the form of metadata that may include a content field, a frame number field, and/or a timestamp field, among other information, for example.

In one or more scenarios, among others, the one or more requests may include one or more of a request for caption content that may correspond to at least one scene in the media content in which a user-designated activity is portrayed/depicted/audible (e.g., aircraft/flying activity, swimming activity, dancing activity, and/or combat activity, etc.), a request for caption content that may correspond to at least one scene in the media content in which one or more sounds consistent with a user-designated activity are audible, a request for caption content that may correspond to at least one scene in the media content in which any spoken words are audible/portrayed, and/or a request for caption content that may correspond to at least one scene in the media content in which one or more user-designated words are audible/portrayed.

The caption & AR management module 220 may be configured to ascertain one or more frames of the media content that may correspond to the request for caption content (e.g. frames that may be part of the one or more scenes of interest to the user). The caption & AR management module 220 may be configured to ascertain specific content from the one or more frames of the media content corresponding to the request for caption content. For example, a user may select/designate the spoken/audible dialogue of one or more specific characters (e.g., perhaps only the dialogue of one or more specific characters), etc.

The caption & AR management module 220 may be configured to identify at least one source of the caption content. In one or more scenarios, the at least one source of the caption content may include at least one Internet-based database including at least some of the requested caption content, identifying at least one speech-to-text algorithm to provide at least some of the requested caption content, identifying a user-provided caption content designated by the user to provide at least some of the requested caption content; and/or identifying a user-created caption content database including at least some of the requested caption content, among other sources of caption content, for example.

The caption & AR management module 220 may be configured to provide the caption content, perhaps for example in a format such that the caption content may be displayable with the one or more frames of the media content. In one or more scenarios, the user may selectively monitor the media content with and/or without the caption content, perhaps for example in a modified presentation of the media content, among other scenarios. The modified presentation may include the functionality to permit the user to activate and/or deactivate the caption content for the media content, for example, among other scenarios.

The caption & AR management module 220 may be configured to provide a (e.g., visual) preview (e.g., via the API, and/or via a monitor device in communication with the media control device, etc.) of the one or more frames of the media content that may correspond to a potential request for caption content. The caption & AR management module 220 may be configured to receive an input (e.g., via the API, and/or text, and/or the like) that may indicate a confirmation of the preview of the one or more frames of the media content that may correspond to the potential request for caption content. The caption & AR management module 220 may be configured to store the visual preview in a memory (e.g., in a saved collection of previews) of the media control device, perhaps for example in a format that may accessible by the API and/or at least one monitor device in communication with the media control device, among other devices.

The stored visual preview may be referrable/referred to by the input indicating at least one request for caption content for at least a part of the media content. This may permit a user to benefit from a previously created identification of one or more scenes of interest in the media content. For example, the stored preview may be of one or more frames of the media content that may correspond to one or more scenes in which character/personnel dancing is depicted/audible/portrayed as a result of the user identifying such types/kinds of scenes of interest in the media content (e.g., via user voice, and/or text, and/or manual input to the API or otherwise, etc.).

In one or more scenarios, the caption & AR management module 220 may be configured to receive an input via the microphone device (e.g., via user voice, and/or text, and/or manual input to the API or otherwise, etc.) that may correspond to user-provided caption content for the one or more frames of the media content. The caption & AR management module 220 may be configured to store the user-provided caption content in at least a memory of the media control device, among other locations, for example. The stored user-provided caption content may serve as at least one source of the caption content, for example. For example, the user may wish to provide custom caption content for at least some part of the media content (e.g., even for scenes in which there might not be any character/person audible/depicted/portrayed dialogue). The techniques described herein to provide the caption content may use the user-provided caption content as if it were like any other accessible source of caption content, for example.

In one or more scenarios, the caption & AR management module 220 may be configured to ascertain at least one frame of the one or more frames of the media content that may correspond to the request for caption content, perhaps for example using one or more audio analytics algorithms. For example, a sequence of audio spectrogram frames can be converted into an array of values, a d-vector, and multiplexed into the signal stream. With the speaker encoding approach, each speaker d-vector has a separate speaker embedding. So, during the time of reconstruction of captions, based on the user profile, the corresponding speaker embedding is identified, and a speech-text routine will be able to generate the corresponding captions. A Speaker Diarization system can be used to match the user profile and the list of speaker embeddings. The caption & AR management module 220 may be configured to identify one or more frames that may be the same and/or substantially similar to the at least one frame of the one or more frames of the media content that may correspond to the request for caption content, perhaps for example by using one or more machine-learning audio algorithms, and/or one or more machine-learning video algorithms.

For example, an automatic change captioning system like dynamic attention model, which can generate captions, between selected frames, can generate the captions, which can multiplex into the signal stream.

In one or more scenarios, the caption & AR management module 220 may be configured to apply/export/provide the requested caption content for at least a part of the media content to one or more frames of the media content that may be identified as the same and/or substantially similar to the at least one frame of the media content that may correspond to the request for caption content, among other scenarios, for example.

In one or more scenarios, the caption & AR management module 220 may be configured to store the caption content in the displayable format in at least a memory of the media control device, and/or to provide the displayable caption content with at least the one or more frames, perhaps for example in a modified presentation of the media content. The modified presentation may include the functionality to permit the user to activate and/or deactivate the caption content for the media content, for example, among other scenarios.

In one or more scenarios, the caption & AR management module 220 may be configured to receive an input that may correspond to a request for a text summarization of the one or more frames of the media content that may correspond to the request for caption content. The caption & AR management module 220 may be configured to generate the text summarization of the one or more frames of the media content that may correspond to the request for caption content. The caption & AR management module 220 may be configured to store the text summarization in at least a memory of the media control device, and/or to provide the text summarization in a displayable form.

For example, in one or more scenarios, the caption & AR management module 220 may be configured to generate a text summarization, perhaps for example of the one or more frames for which requested caption content may have been provided. In one or more scenarios, the text summary/summarization may be generated using the one or more CCaaS techniques described herein. For example, Abstractive Text Summarization (e.g., using one or more NLP algorithms) may be used for the text summary. The text summary may be used to title, describe, and/or annotate the media content, at least in part, among other scenarios.

A home and/or business network may provide for significant opportunities for value added devices and/or services. Technologies that may provide consumers with augmented reality feedback for one or more subject matter areas, such as in personal health care and fitness for example, among other subject matter areas, may be useful. For example, one or more camera devices and/or augmented reality and/or virtual reality devices and techniques may provide a user with health and fitness evaluation/feedback and/or instruction in a remote setting (e.g., away from a gym, a doctor's office, and/or other group health/fitness locations, etc.), such as a home environment, among other remote environments.

In one or more scenarios, one or more camera devices and/or augmented reality devices (not shown) and/or virtual reality devices (not shown) may be used in one or more health and fitness applications. For example, a personal fitness trainer may be valuable coach for fitness and health in many situations. The trainer may provide valuable input to the user/trainee/patient, perhaps for example regarding graded exercises, and/or proper posture, and/or the like.

There may be situations where a personal trainer might not be physically involved, for example in a travel scenario where time-zones may be different from the home and/or business environments. Work-from-home scenarios may present situations where the user exercise timing might not match with the availability of the trainer. There may be online applications that may provide fitness/health tutoring. Such applications may assume the user is performing correctly. In such applications, the trainer might not be available at the time that the user is exercising/practicing etc., for example, and the user may miss out on the coaching/tutoring/advice of the trainer.

In one or more scenarios, cameras, analytics, augmented reality (AR), and/or virtual reality (VR) may be made to function as a service in the media control device (e.g., in a home and/or business environment). For example, a user may obtain/download one or more compatibly configured fitness applications and, perhaps with using one or more cameras and/or a VR headset, may engage a "virtual" personal trainer/training session.

In one or more scenarios, the one or more fitness applications may include a "learning mode", or the like, that may provide a learning mode for the user. The learning mode may offer one or more demonstrations, perhaps with one or more different fitness routines. The user may use a "working mode" in the one or more fitness applications. For example, while in the working mode, the user can follow one or more fitness routines on a television/monitor device that may be connected the media control device, or other streaming media device.

In one or more scenarios, the one or more cameras may capture/record the user's movement(s). One or more (e.g., deep) machine learning algorithms (e.g., on the Internet/Cloud and/or on the media control device, etc.), may be used to find/detect/ascertain one or more, or any, variations in the user motion/movements, perhaps as compared to the actual routine depicted/illustrated in the one or more fitness applications. Some popular deep learning algorithms are: Convolutional Neural Network (CNN), Recurrent Neural Networks (RNNs), Long Short-Term Memory Networks (LSTMs), Stacked Auto-Encoders, Deep Boltzmann Machine (DBM) and Deep Belief Networks (DBN).

In one or more scenarios, the media control device may generate a visual and/or audio feedback to the user, perhaps for example so that the user may correct the posture, and/or any other user motions/movements in which variations may have been detected/ascertained. For example, the user's posture may be projected on the television/monitor. The one or more user variations may be highlighted, perhaps for example as a contour difference and/or in a color map, etc. One or more such images may be projected on/in an AR/VR headset display, perhaps for example to provide for a three-dimensional (3D) immersive fitness routine experience for the user. In one or more scenarios, an audio device (e.g., a speaker device) can may be used to provide audio feedback for the user's motion/movement variation analysis.

In one or more scenarios, the user can select to obtain the feedback in one or more different ways. For example, the user may select feedback via one or more AR/VR projected image contours, via audio feedback, and/or via one or more wearable smart device.

In one or more scenarios, an augmented reality screen update can provide one or more details/information regarding one or more expected movements, angle(s) of an elbow, and/or calorific burn, and/or the like. In one or more scenarios, the detection/auto-detection of the user's fitness exercise/routine posture and/or the projection of the user's deviational posture(s) on a video game-playing system, for example.

In one or more scenarios, the user can choose the audio update(s) according to a user preference, perhaps for example in the user's own voice and/or the voice(s) of one or more others as selected by the user. For example, one or more voice cloning algorithms can be used to enable voice conversion, perhaps in a predetermined set, among other scenarios. For example, a user may provide/obtain one or more preregistered voices. Examples of voice cloning algorithms can be found in US20190251952, incorporated by reference herein in its entirety, and Arik et al., "Neural Voice Cloning with a Few Examples," 32nd Conference on Neural Information Processing Systems (NeurIPS 2018), Montreal, Canada. An analytical summary of the user routines may be provided, such as determination of predefined categories of events at location and time of day to determine periods of heightened awareness and interest in those types of events, ancillary activities, advertisement interests, etc. Historical data of the user's routines can be provided to the user, for example.

In one or more scenarios, the user can monitor a video on a display (e.g., an AR/VR headset and/or television monitor, and/or the like) perhaps to enjoy an audio/visual presentation while exercising/during a workout. The one or more fitness applications may include a "transparent mode." In such a mode, perhaps for example if the user's motion/movement/exercise/workout/routine is incorrectly done in some fashion, the incorrect movement may be projected on the display and/or the video may be paused.

In one or more scenarios, one or more haptic wearables may be integrated into the one or more fitness applications, perhaps for example for providing feedback to the user regarding exercise/motion/movement variation. In one or more scenarios, one or more haptic wearables may be integrated into the one or more fitness applications, perhaps for example for providing input/detections of user motion/movement/exercise variations, for example.

The routing module 210 can route communications, requests, determinations, and/or detections of captioning media content and/or augmented reality functions by/for the caption & AR management module 220. For example, the routing module 210 can translate the communications, requests, determinations, and/or detections of captioning media content and/or augmented reality functions into and/or with an address (e.g., IP address) associated with the caption & AR management module 220. The status detection module 215 may monitor the network connection status of the CPE device 110.

The status detection module 215 may ascertain the status of the network connection for the CPE device 110. The status detection module 215 can monitor the network connection of the CPE device 110 through the network interface 225. The status detection module 215 can monitor one or more various components that are associated with the network connection for the CPE device 110. For example, the status detection module 215 can monitor one or more hardware components (e.g., internal hardware components of the CPE device 110, connection cables such as radio frequency cables, phone lines, and/or digital subscriber lines, etc.) that may be used in the connection of the CPE device 110 to a network. This may include physical status detection (e.g., physical mapping to signal). Perhaps for example if no signal is detected, a physical component may be broken (e.g., broken line or disconnected plug, etc.), among other potential issues. A prompt can instruct a subscriber to check an associated connector and/or line.

The status detection module 215 can monitor the status of the network and/or data link layer(s) associated with the CPE device 110. For example, the status detection module 215 can monitor the CPE device's 110 connection to a host server (e.g., dynamic host configuration protocol server) and/or the status of configuration information received from the host server. For example, the status detection module 215 can monitor the CPE device's 110 connection to a packet routing server (e.g., a point-to-point protocol PPP server) and/or subscriber credentials such as a username and password associated with the packet routing server. Data link layer status may include failed (synchronization failure), connected, on-doing/on-going (synchronizing), and/or others. Perhaps for example in response to a failure, among other scenarios, a re-scan for a cable line and/or retraining for DSL line may be attempted.

The communications, requests, determinations, and/or detections of captioning media content and/or augmented reality functions may be transmitted and/or stored in one or more files, such as text files (e.g., Hypertext Transfer Protocol (HTTP) files), among other type of files.

The CPE device 110 may store one or more, or multiple, files that may be ordered (e.g., hierarchically according to a specific order) for carrying out one or more actions in the setup of a device (e.g., set-top box 110b). The caption & AR management module 220 may include and/or be in communication with a buffer 235. The buffer 235 can store a subscriber communication (e.g., URL or IP address received from the subscriber) and/or the communications, requests, determinations, and/or detections of captioning media content and/or augmented reality functions.

In one or more scenarios, perhaps for example when the status detection module 215 may ascertain that a network connection issue might no longer exist, the buffer 235 can output the subscriber communication and/or the communications, requests, determinations, and/or detections of captioning media content and/or augmented reality functions through the network interface 225.

In one or more scenarios, media content elements of the electronic content may include one or more of over-the-top (OTT) video, cable video, broadcast video, and/or satellite video, among other types of video content.

Figure 3:
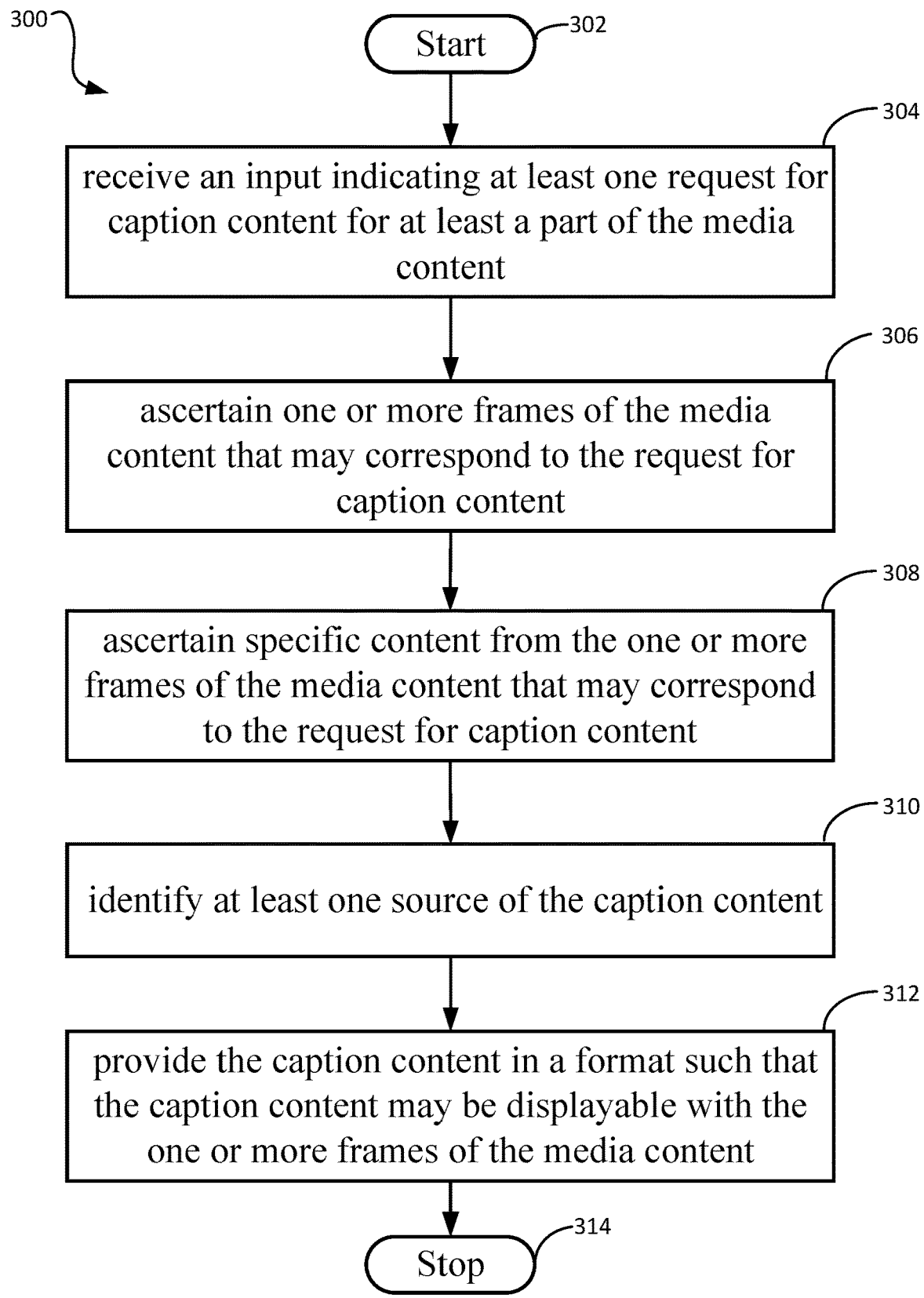
FIG. 3 is an example flow diagram of at least one technique for servicing a video conference.

Referring now to FIG. 3, an example diagram 300 illustrates a technique for servicing a video conference by a media control device, among other devices. For example, the media control device may be a set-top box such as device 110b, among other devices 110a-110d and/or 140a-140i, and/or a cloud computing device, for example. The media control device may be in communication with a microphone device; perhaps for example, via a user network such as subscriber network 130, and/or the Internet. At 302, the process may start or restart.

At 304, the media control device may receive an input indicating at least one request for caption content for at least a part of the media content. At 306, the media control device may ascertain one or more frames of the media content that may correspond to the request for caption content. At 308 the media control device may ascertain specific content from the one or more frames of the media content that may correspond to the request for caption content.

At 310, the media control device may identify at least one source of the caption content. At 312, the media control device may provide the caption content in a format such that the caption content may be displayable with the one or more frames of the media content.

At 314 the process may stop or restart. In one or more scenarios, the media control device may be a set-top box, a cloud-based computing device, a mobile device, a television, a personal computing device, a home gateway, and/or a media gateway, among other devices.

Figure 4:
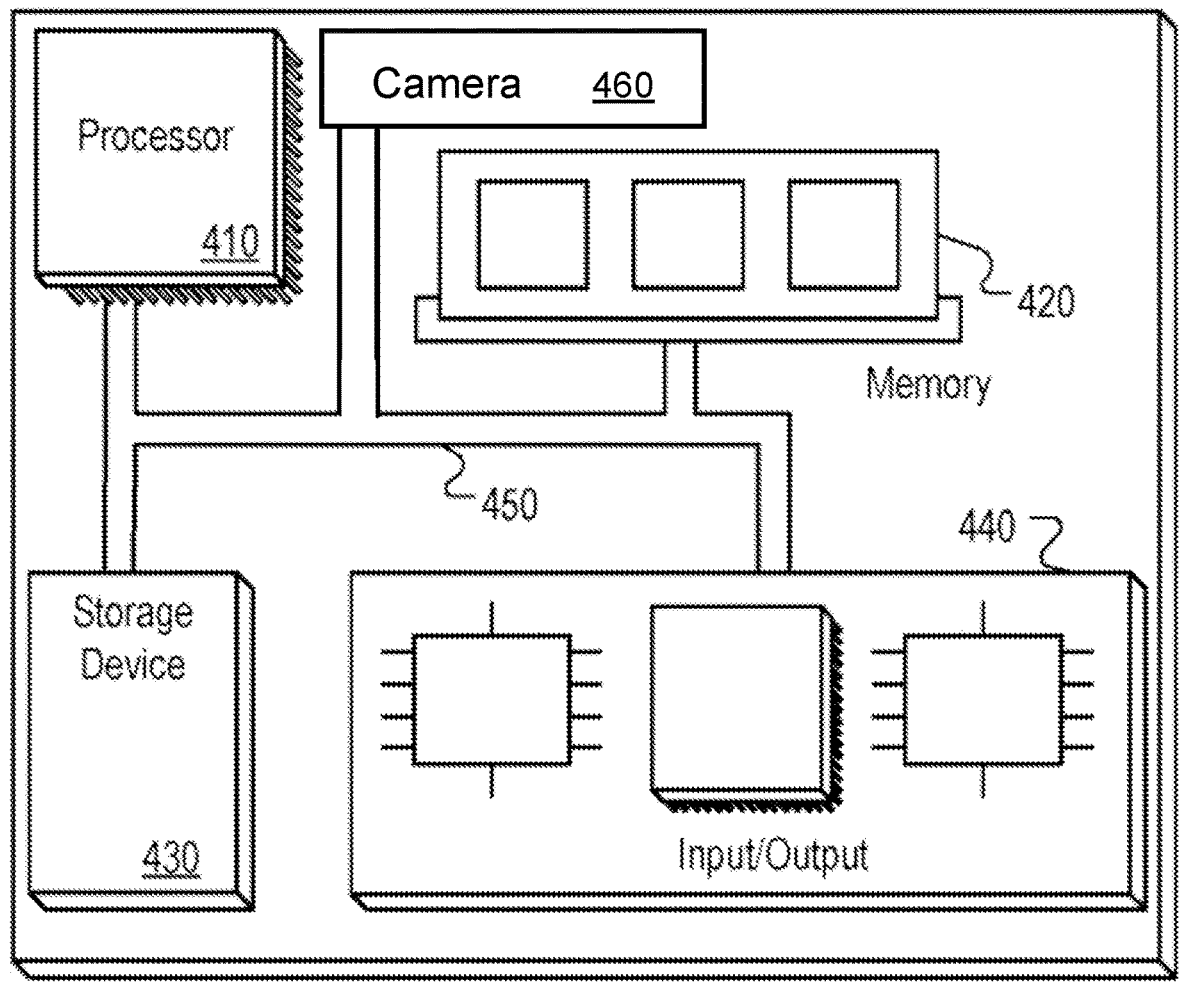
FIG. 4 is a block diagram of a hardware configuration of an example device that may deliver electronic content, such as the CPE device of FIG. 2.

FIG. 4 is a block diagram of a hardware configuration of an example device that may deliver electronic content/media content (e.g., video and/or audio content/components of electronic content), such as the CPE device 110 of FIG. 2, among other devices such as 140a-140i, devices 110a-110d, for example. The hardware configuration 400 may be operable to facilitate delivery of information from an internal server of a device. The hardware configuration 400 can include a processor 410, a memory 420, a storage device 430, and/or an input/output device 440. One or more of the components 410, 420, 430, and 440 can, for example, be interconnected using a system bus 450. The processor 410 can process instructions for execution within the hardware configuration 400. The processor 410 can be a single-threaded processor or the processor 410 can be a multi-threaded processor. The processor 410 can be capable of processing instructions stored in the memory 420 and/or on the storage device 430.

The memory 420 can store information within the hardware configuration 400. The memory 420 can be a computer-readable medium (CRM), for example, a non-transitory CRM. The memory 420 can be a volatile memory unit, and/or can be a non-volatile memory unit.

The storage device 430 can be capable of providing mass storage for the hardware configuration 400. The storage device 430 can be a computer-readable medium (CRM), for example, a non-transitory CRM. The storage device 430 can, for example, include a hard disk device, an optical disk device, flash memory and/or some other large capacity storage device. The storage device 430 can be a device external to the hardware configuration 400.

The input/output device 440 may provide input/output operations for the hardware configuration 400. The input/output device 440 (e.g., a transceiver device) can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). The input/output device can include driver devices configured to send communications to, and/or receive communications from one or more networks (e.g., subscriber network 120 of FIG. 1).

The camera device 460 may provide digital video input/output capability for the hardware configuration 400. The camera device 460 may communicate with any of the elements of the hardware configuration 400, perhaps for example via system bus 450. The camera device 460 may capture digital images and/or may scan images of various kinds, such as Universal Product Code (UPC) codes and/or Quick Response (QR) codes, for example, among other images.

The camera device 460 may include at least one microphone devices and/or at least one speaker device. The input/output of the camera device 460 may include audio signals/packets/components, perhaps for example separate/separable from, or in some (e.g., separable) combination with, the video signals/packets/components the camera device 460.

The camera device 460 may also detect the presence of one or more people that may be proximate to the camera device 460 and/or may be in the same general space (e.g., the same room) as the camera device 460. The camera device 460 may gauge a general activity level (e.g., high activity, medium activity, and/or low activity) of one or more people that may be detected by the camera device 460. The camera device 460 may detect one or more general characteristics (e.g. height, body shape, skin color, pulse, heart rate, breathing count, etc.) of the one or more people detected by the camera device 460. The camera device 460 may be configured to recognize one or more specific people, for example.

The camera device 460 may be in wired and/or wireless communication with the hardware configuration 400. In one or more scenarios, the camera device 460 may be external to the hardware configuration 400. In one or more scenarios, the camera device 460 may be internal to the hardware configuration 400.

Figure 5:
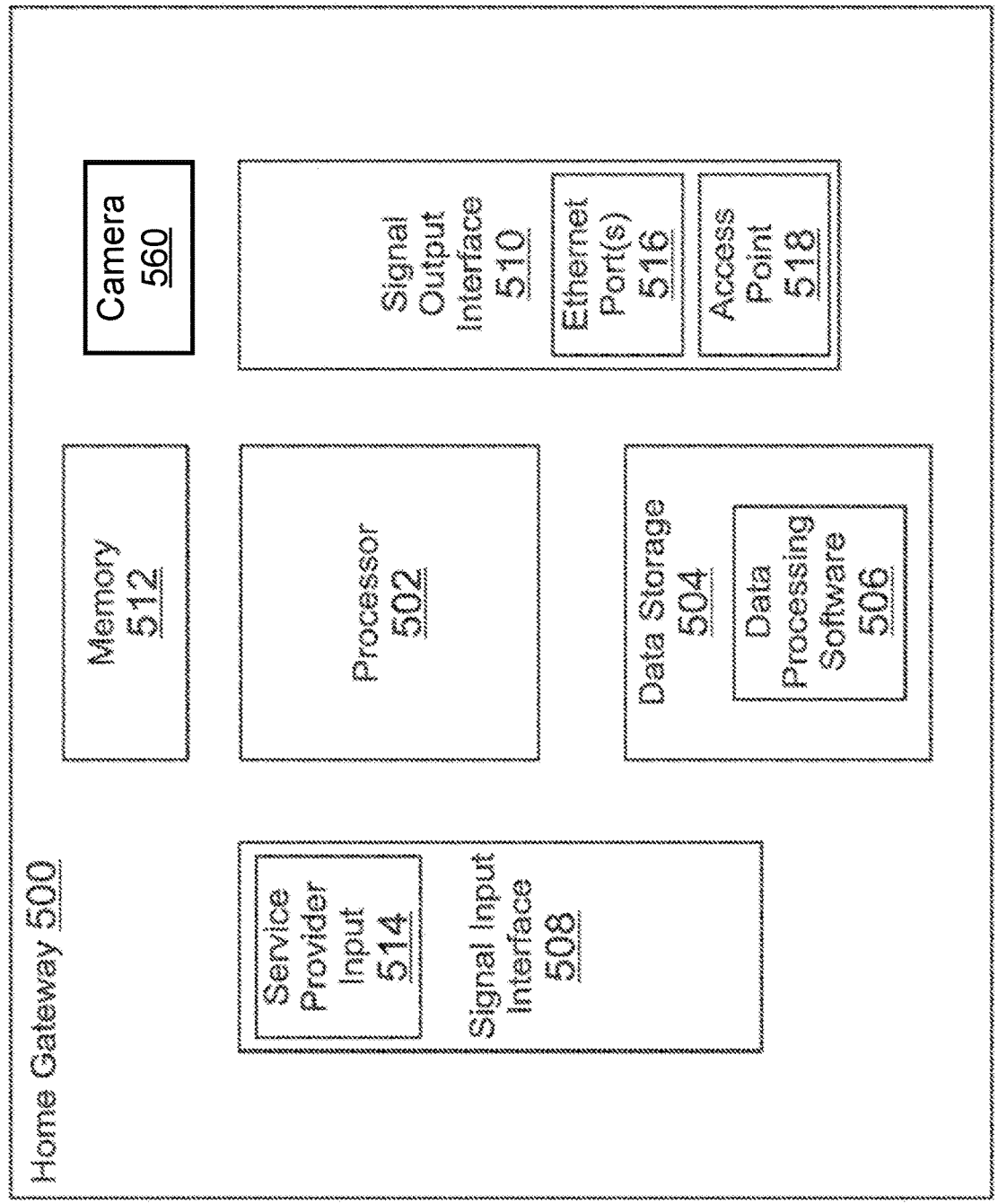
FIG. 5 is a block diagram of a hardware configuration of an example device that may deliver electronic content, such as a home gateway.

FIG. 5 is a block diagram of a hardware configuration of an example device that may deliver electronic content/media content (e.g., video and/or audio components of electronic content), such as a home gateway (e.g., an access point device), among other devices. A hardware configuration 500 (e.g., home gateway 500) may be constructed in a similar manner to hardware configuration 400 in that the architecture may be built around a general-purpose processor, processor 502, and/or an application specific chip set such as designed for use in a Data Over Cable Service Interface Specification (DOC SIS), a Gigabit Passive Optical Network (GPON), and/or a Digital Subscriber Line (DSL) modem. As with processor 402, the general-purpose processor 502 may also be an off-the-shelf processor. The functionality of the desired modem may be implemented through data processing software 506 stored in data storage 504 and/or may be run on processor 502.

Home gateway 500 may include signal input interface 508 and/or signal output interface 510. Signal input interface 508 may include, for example, circuitry to receive data input from a service provider at service provider input 514, e.g., a cable and/or a fiber optic input.

Signal output interface 510 may provide the output of the home gateway 500. Signal output interface 510 may provide signals in formats for transmission over a datalink. For example, interface 510 may include one or more Ethernet ports 516 and/or a wireless access point 518. Data may be communicated over wired and/or wireless networks. The access point 518 may be located external to the home gateway 500. Video and/or audio content received at signal input interface 508 can be streamed from home gateway 500 to hardware configuration 400, perhaps for example as another source of video and/or audio signal. This streaming may be accomplished over a reliable backhaul communication link (not shown) that may provide good video quality, perhaps for example for signals that are sensitive to latency in the signal (e.g., live programming). The signal input interface 508 and the signal output interface 510 may operate together, such as for example as a transceiver device.

In operation, a data signal may be received at signal input interface 508 of home gateway 500. Processor 502 may operate data processing software 506 on general-purpose processor 502 to prepare the received signals (e.g., code, decode, etc.). The output of the data processing software 506 may be output by signal output interface 510, e.g., Ethernet port 516 and/or wireless access point 518.

The camera device 560 may provide digital video input/output capability for the home gateway 500. The camera device 560 may communicate with any of the elements of the home gateway 500. The camera device 560 may capture digital images and/or may scan images of various kinds, such as Universal Product Code (UPC) codes and/or Quick Response (QR) codes, for example, among other images.

The camera device 560 may include at least one microphone devices and/or at least one speaker device. The input/output of the camera device 560 may include audio signals/packets/components, perhaps for example separate/separable from, or in some (e.g., separable) combination with, the video signals/packets/components the camera device 560.

The camera device 560 may also detect the presence of one or more people that may be proximate to the camera device 560 and/or may be in the same general space (e.g., the same room) as the camera device 560. The camera device 560 may gauge a general activity level (e.g., high activity, medium activity, and/or low activity) of one or more people that may be detected by the camera device 560. The camera device 560 may detect one or more general characteristics (e.g. height, body shape, skin color, pulse, heart rate, breathing count, etc.) of the one or more people detected by the camera device 560. The camera device 560 may be configured to recognize one or more specific people, for example.

The camera device 560 may be in wired and/or wireless communication with the home gateway 500. In one or more scenarios, the camera device 560 may be external to the home gateway 500. In one or more scenarios, the camera device 560 may be internal to the home gateway 500.

Those skilled in the art will appreciate that the disclosed subject matter improves upon methods and/or apparatuses for providing caption content for media content and/or augmented reality functions related to media content. For example, the subject matter described herein may provide consumers/media content viewers/users with an ability to obtain/create specific caption content and/or user-provided caption content for a media content. The subject matter described herein may at least facilitate a user in obtaining caption content for a media content that may be tailored to the user's specific caption content request and/or creating user-provided caption content for media content. For example, perhaps instead of having to accept caption content for the entirety of the media content that may be generated at the discretion of a third party, the user may initiate/request the caption content techniques described herein for the specific content and/or scenes in the media content of interest to the user.

Those skilled in the art will appreciate that the disclosed subject matter improves upon methods and/or apparatuses for providing feedback to a user in the evaluation of the user's motion/movement in performing exercise/workout routines in accordance with streamed fitness instructor-based videos, perhaps for example using augmented reality devices/functions and/or virtual reality devices/functions.

The subject matter of this disclosure, and components thereof, can be realized by instructions that upon execution cause one or more processing devices to carry out the processes and/or functions described herein. Such instructions can, for example, comprise interpreted instructions, such as script instructions, e.g., JavaScript or ECMAScript instructions, or executable code, and/or other instructions stored in a computer readable medium.

Implementations of the subject matter and/or the functional operations described in this specification and/or the accompanying figures can be provided in digital electronic circuitry, in computer software, firmware, and/or hardware, including the structures disclosed in this specification and their structural equivalents, and/or in combinations of one or more of them. The subject matter described in this specification can be implemented as one or more computer program products, e.g., one or more modules of computer program instructions encoded on a tangible program carrier for execution by, and/or to control the operation of, data processing apparatus.

A computer program (also known as a program, software, software application, script, or code) can be written in any form of programming language, including compiled or interpreted languages, and/or declarative or procedural languages. It can be deployed in any form, including as a stand-alone program or as a module, component, subroutine, and/or other unit suitable for use in a computing environment. A computer program may or might not correspond to a file in a file system. A program can be stored in a portion of a file that holds other programs and/or data (e.g., one or more scripts stored in a markup language document), in a single file dedicated to the program in question, and/or in multiple coordinated files (e.g., files that store one or more modules, sub programs, or portions of code). A computer program can be deployed to be executed on one computer or on multiple computers that may be located at one site or distributed across multiple sites and/or interconnected by a communication network.

The processes and/or logic flows described in this specification and/or in the accompanying figures may be performed by one or more programmable processors executing one or more computer programs to perform functions by operating on input data and/or generating output, thereby tying the process to a particular machine (e.g., a machine programmed to perform the processes described herein). The processes and/or logic flows can also be performed by, and apparatus can also be implemented as, special purpose logic circuitry, e.g., an FPGA (field programmable gate array) and/or an ASIC (application specific integrated circuit).

Computer readable media suitable for storing computer program instructions and/or data may include all forms of non-volatile memory, media and memory devices, including by way of example semiconductor memory devices (e.g., EPROM, EEPROM, and/or flash memory devices); magnetic disks (e.g., internal hard disks or removable disks); magneto optical disks; and/or CD ROM and DVD ROM disks. The processor and/or the memory can be supplemented by, or incorporated in, special purpose logic circuitry.

While this specification and the accompanying figures contain many specific implementation details, these should not be construed as limitations on the scope of any invention and/or of what may be claimed, but rather as descriptions of features that may be specific to described example implementations. Certain features that are described in this specification in the context of separate implementations can also be implemented in combination in perhaps one implementation. Various features that are described in the context of perhaps one implementation can also be implemented in multiple combinations separately or in any suitable sub-combination. Although features may be described above as acting in certain combinations and/or perhaps even (e.g., initially) claimed as such, one or more features from a claimed combination can in some cases be excised from the combination. The claimed combination may be directed to a sub-combination and/or variation of a sub-combination.

While operations may be depicted in the drawings in an order, this should not be understood as requiring that such operations be performed in the particular order shown and/or in sequential order, and/or that all illustrated operations be performed, to achieve useful outcomes. The described program components and/or systems can generally be integrated together in a single software product and/or packaged into multiple software products.

Examples of the subject matter described in this specification have been described. The actions recited in the claims can be performed in a different order and still achieve useful outcomes, unless expressly noted otherwise. For example, the processes depicted in the accompanying figures do not require the particular order shown, and/or sequential order, to achieve useful outcomes. Multitasking and parallel processing may be advantageous in one or more scenarios.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. A method for providing captioning for media content performed by a media control device, the media control device being in communication with a user network and the Internet, the method comprising:
receiving, by the media control device, an input indicating at least one request for caption content for at least a part of a media content;
ascertaining, by the media control device, one or more frames of the media content corresponding to the request for caption content using one or more audio analytics algorithms, wherein the ascertaining the one or more frames of the media content corresponding to the request for caption content includes:
identifying, by the media control device, one or more frames substantially similar to the at least one frame of the one or more frames of the media content corresponding to the request for caption content using at least one of: a machine-learning audio algorithm, or a machine-learning video algorithm;
ascertaining, by the media control device, specific content from the one or more frames of the media content corresponding to the request for caption content;
identifying, by the media control device, at least one source of the requested caption content; and
providing, by the media control device, a displayable version of requested caption content in a format such that the requested caption content is displayable with the one or more frames in a modified presentation of the media content.

2. The method of claim 1, further comprising:
providing, via the media control device, a visual preview of the one or more frames of the media content corresponding to a potential request for caption content;
receiving, by the media control device, a confirmation input indicating a confirmation of the preview of the one or more frames of the media content corresponding to the potential request for caption content; and
storing, by the media control device, the visual preview in a memory of the media control device in a format accessible by at least one monitor device, wherein the stored visual preview is referrable by the input indicating the at least one request for caption content for at least the part of the media content.

3. The method of claim 1, wherein the media control device is in communication with a microphone device, the method further comprising:
receiving, by the media control device, an input via the microphone device corresponding to a user-provided caption content for the one or more frames of the media content; and
storing, by the media control device, the user-provided caption content in at least a memory of the media control device, wherein the stored user-provided caption content serves as the at least one source of the requested caption content.

4. The method of claim 1, wherein the input indicating the at least one request for caption content for at least the part of the media content comprises one or more requests, the one or more requests comprising at least one of:
a request for caption content corresponding to at least one scene in which a user-designated character's voice is audible;
a request for caption content corresponding to at least one scene of the media content having an audio level exceeding a user-designated threshold;
a request for caption content corresponding to at least one scene in the media content in which a user-designated sound is audible;
a request for caption content corresponding to at least one scene in the media content in which a user-designated activity is portrayed;
a request for caption content corresponding to at least one scene in the media content in which one or more sounds consistent with a user-designated activity are audible;
a request for caption content corresponding to at least one scene in the media content in which any spoken words are audible; or
a request for caption content corresponding to at least one scene in the media content in which one or more user-designated words are audible.

5. A method for providing captioning for media content performed by a media control device, the media control device being in communication with a user network and the Internet, the method comprising:
receiving, by the media control device, an input indicating at least one request for caption content for at least a part of a media content;
ascertaining, by the media control device, one or more frames of the media content corresponding to the request for caption content
ascertaining, by the media control device, specific content from the one or more frames of the media content corresponding to the request for caption content;
identifying, by the media control device, at least one source of the requested caption content;
providing, via the media control device, a visual preview of the one or more frames of the media content corresponding to a potential request for caption content;
receiving, by the media control device, a confirmation input indicating a confirmation of the preview of the one or more frames of the media content corresponding to the potential request for caption content;
providing, by the media control device, a displayable version of requested caption content in a format such that the requested caption content is displayable with the one or more frames of the media content; and
storing, by the media control device, the displayable version of requested caption content in at least a memory of the media control device.

6. The method of claim 1, wherein the identifying the at least one source of the caption content further comprises at least one of:
identifying at least one Internet-based database including at least some of the requested caption content;
identifying at least one speech-to-text algorithm to provide at least some of the requested caption content;
identifying a user-provided caption content designated by a user to provide at least some of the requested caption content; or
identifying a user-created caption content database including at least some of the requested caption content.

7. The method of claim 1, further comprising:
receiving, by the media control device, an input corresponding to a request for a text summarization of the one or more frames of the media content corresponding to the request for caption content;

generating, by the media control device, the text summarization of the one or more frames of the media content corresponding to the request for caption content; and at least one of: storing, by the media control device, the text summarization in at least a memory of the media control device, or providing, via the media control device, the text summarization in a displayable form.

8. The method of claim 1, wherein the media control device is at least one of: a set-top box, a home gateway, a cloud-based computing device, a mobile device, a media gateway, a television, or a personal computing device.

9. A media control device configured to provide captioning for media content, the media control device being in communication with a user network and the Internet, the media control device comprising:

a memory; a processor, the processor configured at least to:

receive an input indicating at least one request for caption content for at least a part of the media content;

ascertain one or more frames of the media content corresponding to the request for caption content using one or more audio analytics algorithms, wherein ascertaining the one or more frames of the media content corresponding to the request for caption content includes:

identifying one or more frames substantially similar to the at least one frame of the one or more frames of the media content corresponding to the request for caption content using at least one of: a machine-learning audio algorithm, or a machine-learning video algorithm;

ascertain specific content from the one or more frames of the media content corresponding to the request for caption content;

identify at least one source of the requested caption content; and provide a displayable version of requested the caption content in a format such that the requested caption content is displayable with the one or more frames in a modified presentation of the media content.

10. The media control device of claim 9, wherein the processor is further configured to:

provide a visual preview of the one or more frames of the media content corresponding to a potential request for caption content;

receive a confirmation input indicating a confirmation of the preview of the one or more frames of the media content corresponding to the potential request for caption content; and store the visual preview in the memory of the media control device in a format accessible by at least one monitor device, wherein the stored visual preview is referrable by the input indicating the at least one request for caption content for at least the part of the media content.

11. The media control device of claim 9, wherein the media control device is in communication with a microphone device, the processor being further configured to:

receive an input, via the microphone device, corresponding to a user-provided caption content for the one or more frames of the media content; and store the user-provided caption content in at least the memory, wherein the stored user-provided caption content serves as the at least one source of the caption content.

12. The media control device of claim 9, wherein the processor is further configured such that the input indicating the at least one request for caption content for at least the part of the media content comprises one or more requests, the one or more requests comprising at least one of:

a request for caption content corresponding to at least one scene in which a user-designated character's voice is audible;

a request for the displayable caption content corresponding to at least one scene of the media content having an audio level exceeding a user-designated threshold;

a request for caption content corresponding to at least one scene in the media content in which a user-designated sound is audible;

a request for caption content corresponding to at least one scene in the media content in which a user-designated activity is portrayed;

a request for caption content corresponding to at least one scene in the media content in which one or more sounds consistent with a user-designated activity are audible;

a request for caption content corresponding to at least one scene in the media content in which any spoken words are audible; or a request for caption content corresponding to at least one scene in the media content in which one or more user-designated words are audible.

13. A media control device configured to provide captioning for media content, the media control device being in communication with a user network and the Internet, the media control device comprising:

a memory; a processor, the processor configured at least to:

receive an input indicating at least one request for caption content for at least a part of the media content;

ascertain one or more frames of the media content corresponding to the request for caption content ascertain specific content from the one or more frames of the media content corresponding to the request for caption content;

identify at least one source of the requested caption content;

provide a visual preview of the one or more frames of the media content corresponding to a potential request for caption content;

receive a confirmation input indicating a confirmation of the preview of the one or more frames of the media content corresponding to the potential request for caption content;

provide a displayable version of requested the caption content in a format such that the requested caption content is displayable with the one or more frames of the media content; and store the displayable version of requested caption content in at least the memory.

14. The media control device of claim 9, wherein to identify the at least one source of the caption content, the processor is further configured to at least one of:

identify at least one Internet-based database including at least some of the requested caption content;

identify at least one speech-to-text algorithm to provide at least some of the requested caption content;

identify a user-provided caption content designated by a user to provide at least some of the requested caption content; or identify a user-created caption content database including at least some of the requested caption content.

15. The media control device of claim 9, wherein the processor is further configured to:
receive an input corresponding to a request for a text summarization of the one or more frames of the media content corresponding to the request for caption content;
generate the text summarization of the one or more frames of the media content corresponding to the request for caption content; and
at least one of: store the text summarization in at least the memory of the media control device, or provide the text summarization in a displayable form.

16. The media control device of claim 9, wherein the media control device is at least one of: a set-top box, a cloud-based computing device, a home gateway, a media gateway, a mobile device, a television, or a personal computing device.

17. A non-transitory computer readable medium having instructions stored thereon, the instructions causing at least one processor of a media control device to perform one or more operations, the media control device being in communication with a user network and with the Internet, and the media control device being in communication with a microphone device, the one or more operations comprising at least:
receiving an input indicating at least one request for caption content for at least a part of a media content;
ascertaining one or more frames of the media content corresponding to the request for caption content using one or more audio analytics algorithms, wherein the ascertaining the one or more frames of the media content corresponding to the request for caption content includes:
identifying, by the media control device, one or more frames substantially similar to the at least one frame of the one or more frames of the media content corresponding to the request for caption content using at least one of: a machine-learning audio algorithm, or a machine-learning video algorithm;
ascertaining specific content from the one or more frames of the media content corresponding to the request for caption content;
identifying at least one source of the requested caption content; and
providing a displayable version of requested caption content in a format such that the requested caption content is displayable with the one or more frames in a modified presentation of the media content.

18. The non-transitory computer readable medium of claim 17, wherein the one or more operations further comprise:
providing a visual preview of the one or more frames of the media content corresponding to a potential request for caption content;
receiving a confirmation input indicating a confirmation of the preview of the one or more frames of the media content corresponding to the potential request for caption content; and
storing the visual preview in a memory of the media control device in a format accessible by at least one monitor, wherein the stored visual preview is referrable by the input indicating the at least one request for caption content for at least the part of the media content.

19. The non-transitory computer readable medium of claim 17, wherein the one or more operations for the modifying further comprises:
receiving an input via the microphone device corresponding to a user-provided caption content for the one or more frames of the media content; and
storing the user-provided caption content in at least a memory of the media control device, wherein the stored user-provided caption content serves as the at least one source of the caption content.

20. The non-transitory computer readable medium of claim 17, wherein the one or more operations provide that the input indicating the at least one request for caption content for at least the part of the media content comprises one or more requests, the one or more requests comprising at least one of:
a request for caption content corresponding to at least one scene in which a user-designated character's voice is audible;
a request for caption content corresponding to at least one scene of the media content having an audio level exceeding a user-designated threshold;
a request for caption content corresponding to at least one scene in the media content in which a user-designated sound is audible;
a request for caption content corresponding to at least one scene in the media content in which a user-designated activity is portrayed;
a request for caption content corresponding to at least one scene in the media content in which one or more sounds consistent with a user-designated activity are audible;
a request for caption content corresponding to at least one scene in the media content in which any spoken words are audible; or
a request for caption content corresponding to at least one scene in the media content in which one or more user-designated words are audible.

21. A non-transitory computer readable medium having instructions stored thereon, the instructions causing at least one processor of a media control device to perform one or more operations, the media control device being in communication with a user network and with the Internet, and the media control device being in communication with a microphone device, the one or more operations comprising at least:
receiving an input indicating at least one request for caption content for at least a part of a media content;
ascertaining one or more frames of the media content corresponding to the request for caption content;
ascertaining specific content from the one or more frames of the media content corresponding to the request for caption content;
identifying at least one source of the requested caption content;
providing a visual preview of the one or more frames of the media content corresponding to a potential request for caption content;
receiving a confirmation input indicating a confirmation of the preview of the one or more frames of the media content corresponding to the potential request for caption content;
providing a displayable version of requested caption content in a format such that the requested caption content is displayable with the one or more frames of the media content; and
storing the displayable version of requested caption content in at least a memory of the media control device.

22. The non-transitory computer readable medium of claim 17, wherein for the identifying the at least one source of the caption content, the one or more operations further comprise at least one of:

identifying at least one Internet-based database including at least some of the requested caption content;

identifying at least one speech-to-text algorithm to provide at least some of the requested caption content;

identifying a user-provided caption content designated by a user to provide at least some of the requested caption content; or identifying a user-created caption content database including at least some of the requested caption content.

23. The non-transitory computer readable medium of claim 17, wherein the one or more operations further comprise:

receiving an input corresponding to a request for a text summarization of the one or more frames of the media content corresponding to the request for caption content;

generating the text summarization of the one or more frames of the media content corresponding to the request for caption content; and at least one of: storing the text summarization in at least a memory of the media control device, or providing the text summarization in a displayable form.

\* \* \* \* \*